United States Patent
Humphris

(10) Patent No.: US 9,784,760 B2
(45) Date of Patent: Oct. 10, 2017

(54) PROBE AND SAMPLE EXCHANGE MECHANISM

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 14/910,780

(22) PCT Filed: Aug. 6, 2014

(86) PCT No.: PCT/GB2014/052413
§ 371 (c)(1),
(2) Date: Feb. 8, 2016

(87) PCT Pub. No.: WO2015/019090
PCT Pub. Date: Feb. 12, 2015

(65) Prior Publication Data
US 2016/0187376 A1 Jun. 30, 2016

(30) Foreign Application Priority Data

Aug. 9, 2013 (GB) .................................. 1314302.9

(51) Int. Cl.
*G01Q 30/20* (2010.01)
*G01Q 70/02* (2010.01)
*B82Y 35/00* (2011.01)

(52) U.S. Cl.
CPC ............. *G01Q 30/20* (2013.01); *G01Q 70/02* (2013.01); *B82Y 35/00* (2013.01)

(58) Field of Classification Search
CPC ........ B82Y 35/00; G01Q 10/02; G01Q 70/02; G01Q 70/06; G01Q 30/20
(Continued)

(56) References Cited

U.S. PATENT DOCUMENTS

| 4,992,660 A | 2/1991 | Kobayashi | |
| 5,157,256 A * | 10/1992 | Aaron | B82Y 35/00 250/442.11 |

(Continued)

FOREIGN PATENT DOCUMENTS

| JP | H0326902 A | 2/1991 |
| JP | 2001235416 | 8/2001 |

(Continued)

OTHER PUBLICATIONS

International Search Report and Written Opinion for International Application No. PCT/GB2014/052413 mailed Sep. 29, 2014.
(Continued)

*Primary Examiner* — Nicole Ippolito
(74) *Attorney, Agent, or Firm* — Benjamin J. Hauptman

(57) ABSTRACT

A scanning probe microscope system. A sample stage is provided along with a microscope arranged to collect data with a probe carried by the microscope from a sample carried by the sample stage. A probe/sample exchange mechanism is arranged to exchange the probe carried by the microscope with a new probe, and is also arranged to exchange the sample carried by the sample stage with a new sample. The probe/sample exchange mechanism comprises a transport structure which can move relative to the microscope and the sample stage; a probe carrier carried by the transport structure and adapted to carry the probe or the new probe when the probe is exchanged with the new probe; a sample carrier carried by the transport structure, wherein the sample carrier is adapted differently from the probe carrier to carry the sample or the new sample when the sample is exchanged with the new sample; and a drive system arranged to move the transport structure relative to the microscope and the sample stage when the probe is
(Continued)

exchanged with the new probe and the sample is exchanged with the new sample.

20 Claims, 16 Drawing Sheets

(58) Field of Classification Search
USPC .......... 250/306, 307, 309, 310, 311, 440.11, 250/441.11, 442.11, 443.1
See application file for complete search history.

(56) References Cited

U.S. PATENT DOCUMENTS

| | | | | |
|---|---|---|---|---|
| 5,455,420 | A * | 10/1995 | Ho | B82Y 35/00 250/442.11 |
| 5,705,814 | A | 1/1998 | Young et al. | |
| 5,750,989 | A * | 5/1998 | Lindsay | B82Y 35/00 250/442.11 |
| 7,709,791 | B2 | 5/2010 | Jo et al. | |
| 8,099,793 | B2 | 1/2012 | Jo et al. | |
| 8,110,818 | B2 | 2/2012 | Wang et al. | |
| 8,371,182 | B1 | 2/2013 | Israelachvili | |
| 2008/0229812 | A1 * | 9/2008 | Hund | G01Q 30/20 73/105 |
| 2010/0294927 | A1 | 11/2010 | Nelson et al. | |
| 2013/0319127 | A1 | 12/2013 | Vodnick et al. | |

FOREIGN PATENT DOCUMENTS

| | | |
|---|---|---|
| RU | 2380785 C2 | 1/2010 |
| WO | 2009102238 A1 | 8/2009 |
| WO | 2012109577 A2 | 8/2012 |

OTHER PUBLICATIONS

UKIPO Search Report in GB Application No. 1314302.9 mailed Jan. 29, 2014.

* cited by examiner

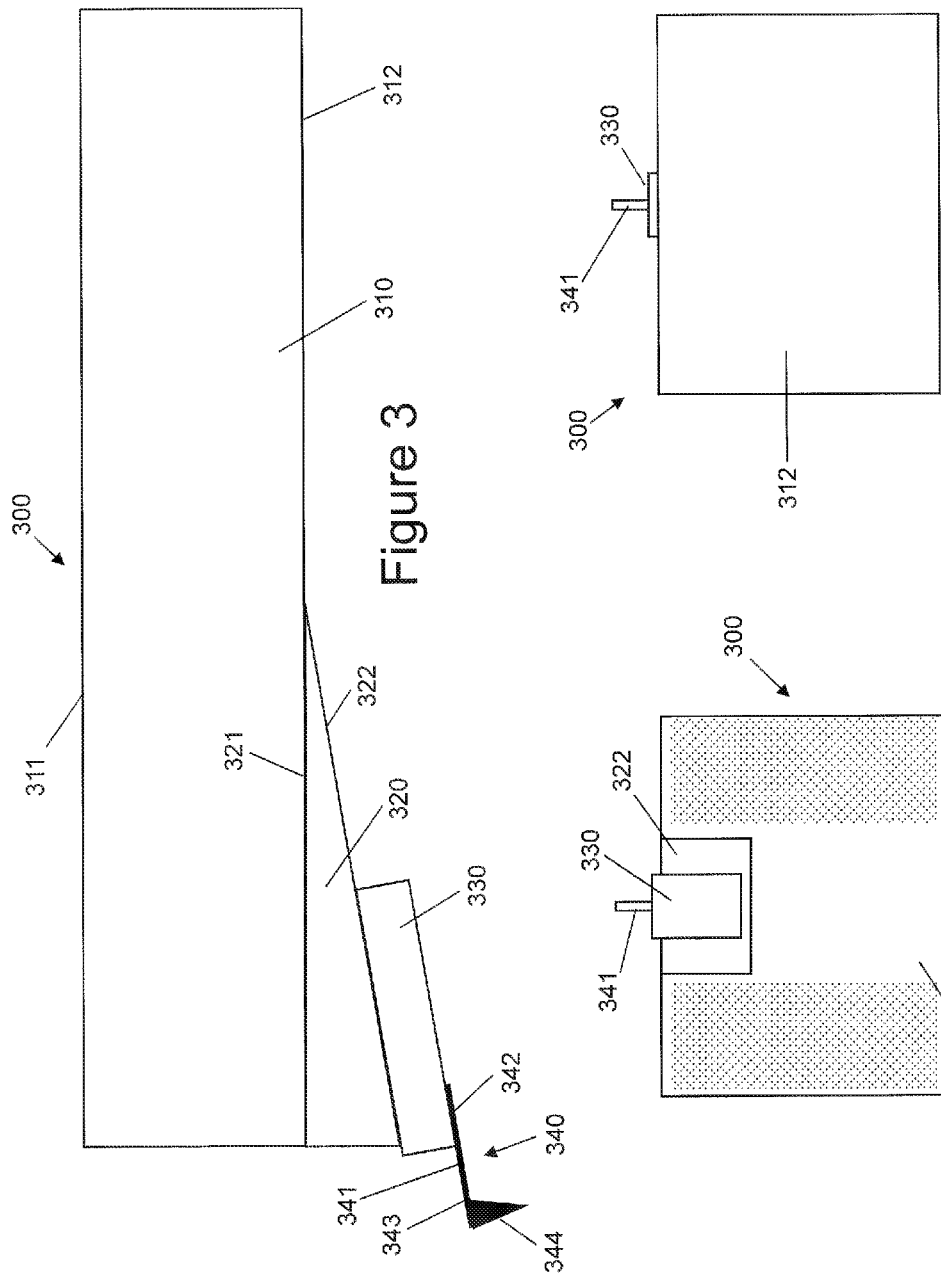

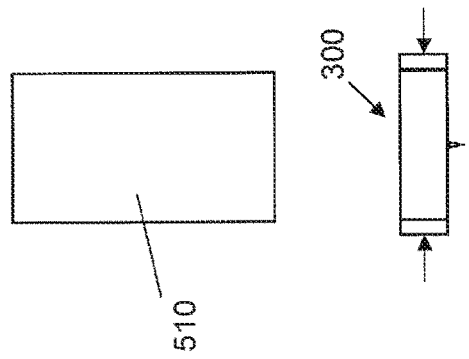
Figure 11
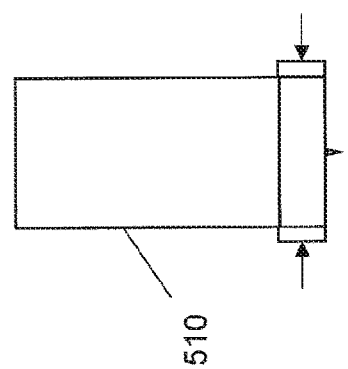
Figure 10
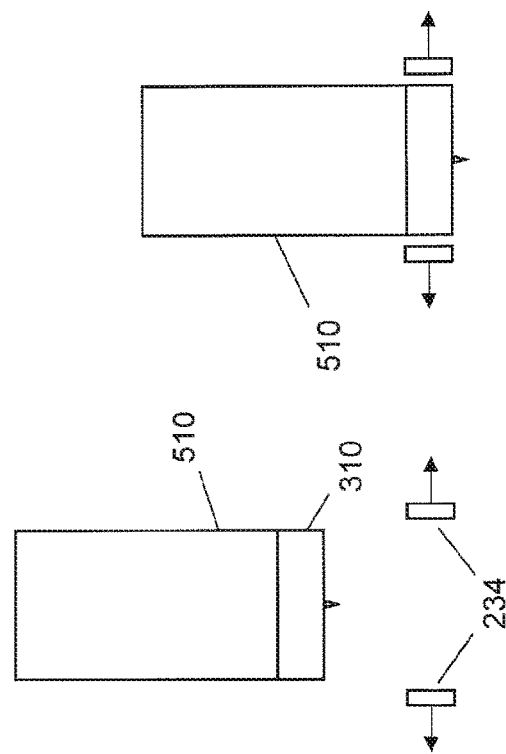
Figure 9
Figure 8

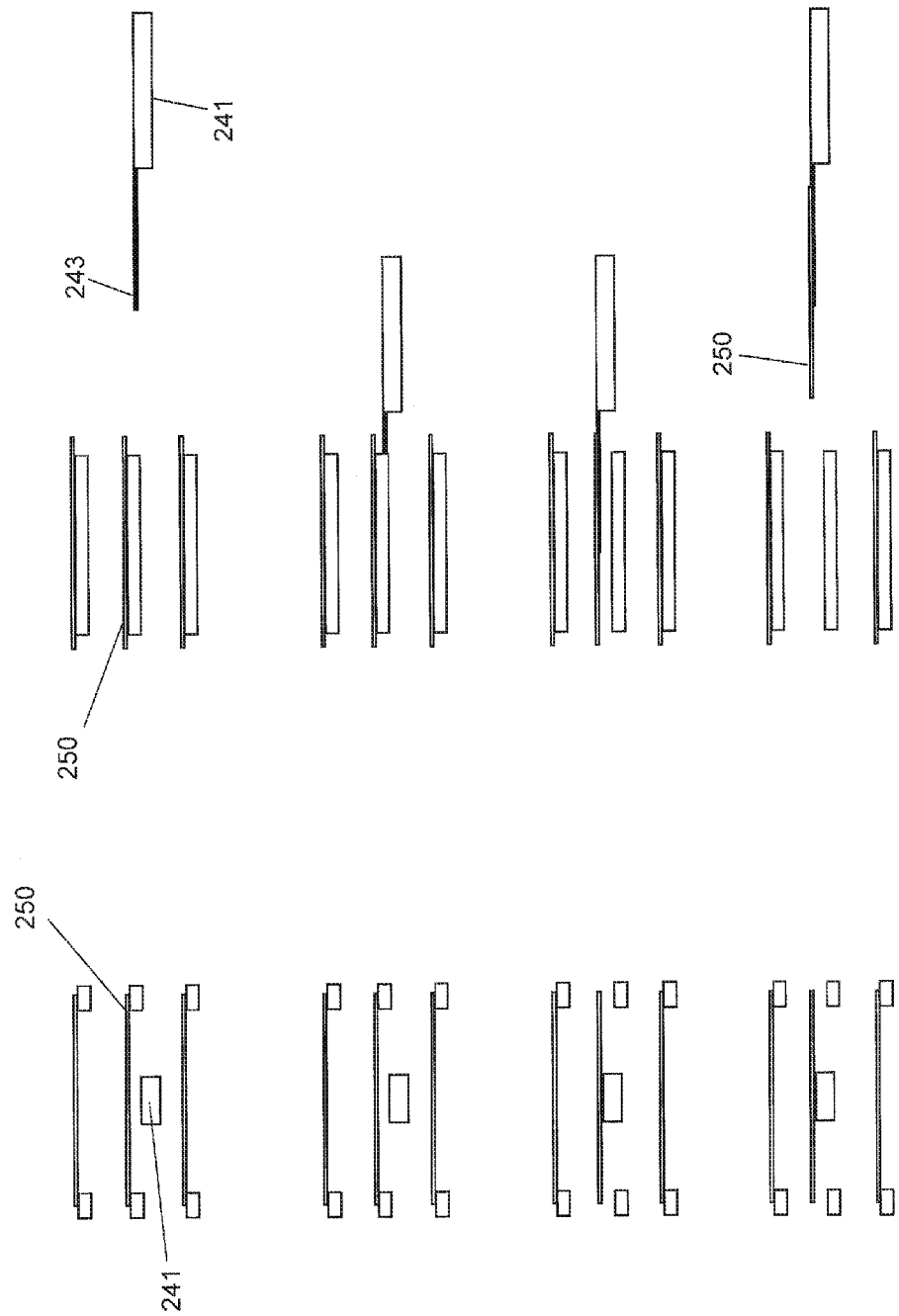

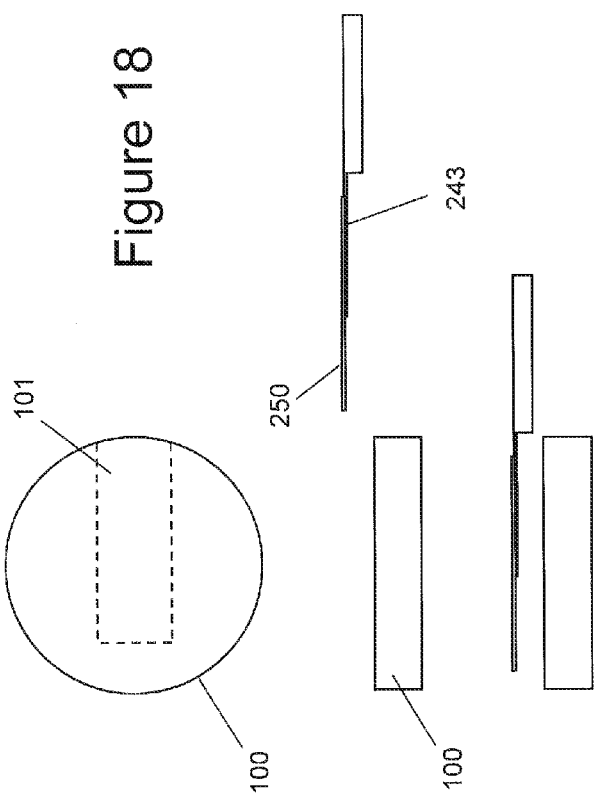
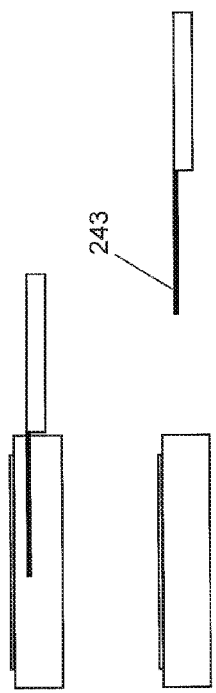
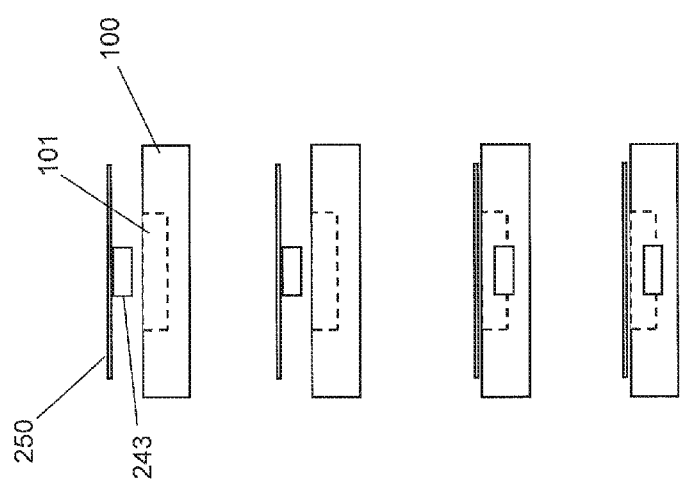

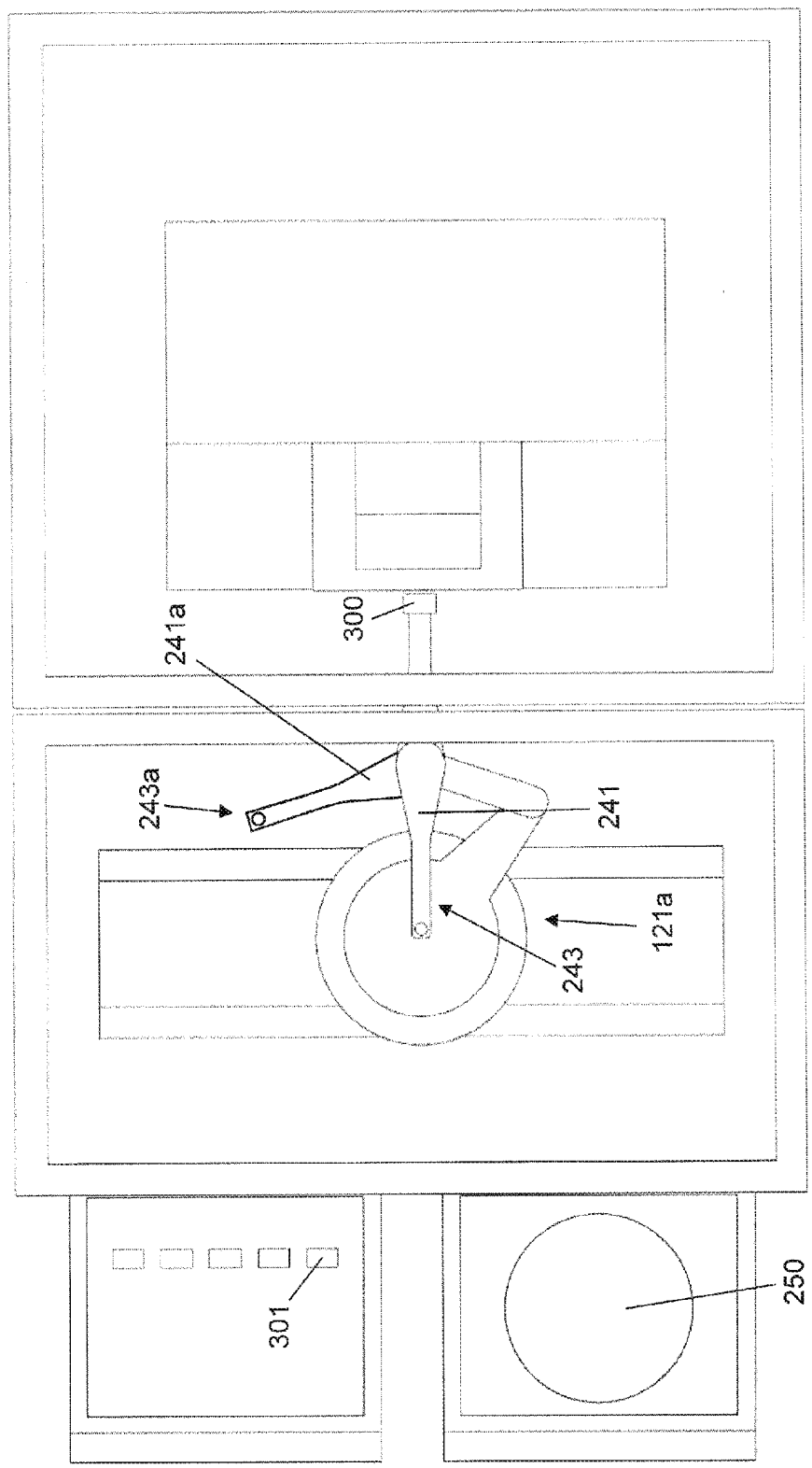

PROBE AND SAMPLE EXCHANGE MECHANISM

RELATED APPLICATIONS

The present application is a National Phase of International Application Number PCT/GB2014/052413, filed Aug. 6, 2014, and claims priority to Great Britain Application Number 1314302.9, filed Aug. 9, 2013.

FIELD OF THE INVENTION

The present invention relates to a scanning probe microscope system with a probe/sample exchange mechanism. The invention also relates to a method of collecting data from a sample using such a system.

BACKGROUND OF THE INVENTION

Scanning probe microscope systems collect data from a sample on a sample stage by generating a relative scanning motion between a probe and the sample (by moving the probe and/or the sample) and monitoring an interaction between the probe and the sample.

It may be necessary to replace the probe, either because the probe has worn out or because a different type of probe is required (for instance to measure a different property of the sample). Known probe exchange mechanisms are described in U.S. Pat. Nos. 5,705,814, 7,709,791 and 8,099,793.

SUMMARY OF THE INVENTION

A first aspect of the invention provides a scanning probe microscope system as described in claim 1. An exchange mechanism is provided which is not only arranged to exchange a probe carried by the microscope or by the sample stage with a new probe, but is also arranged to exchange the sample carried by the sample stage with a new sample. The exchange mechanism comprises a probe carrier and a sample carrier both carried by the same transport structure. The probe carrier is specially adapted to carry the probe and/or the new probe when the probe is exchanged with the new probe. Similarly the sample carrier is specially adapted to carry the sample and/or the new sample when the sample is exchanged with the new sample.

The sample carrier is adapted differently from the probe carrier. For instance the probe carrier may use a pair of pincers to grip the probe, and the sample carrier may apply a vacuum to hold the sample. Alternatively the probe carrier may comprise a magnetic coil or permanent magnet which is adapted to grip the probe with a magnetic field, and the sample carrier may consist of a platform which is adapted to hold the sample with friction only.

Typically the probe carrier is adapted to directly contact the sample and the sample carrier is adapted to directly contact the sample.

The sample carrier may be adapted to hold the sample actively or passively, using a variety of methods including (but not limited to) friction, vacuum, mechanical gripping, electrostatic attraction, and magnetic attraction (permanent or switchable).

Similarly the probe carrier may be adapted to hold the probe actively or passively, using a variety of methods including (but not limited to) friction, vacuum, mechanical gripping, electrostatic attraction, and magnetic attraction (permanent or switchable).

Typically the probe carrier and the sample carrier are adapted to carry the probe and sample by different first and second methods respectively. For instance the probe carrier is adapted to carry the probe using a first method selected from friction, vacuum, mechanical gripping, electrostatic attraction, and magnetic attraction (permanent or switchable); and the sample carrier is adapted to carry the sample using a second method selected from friction, vacuum, mechanical gripping, electrostatic attraction, and magnetic attraction (permanent or switchable), wherein the second method is different from the first method. Alternatively the probe carrier and the sample carrier may be adapted to use the same method for carrying the probe/sample, but they are adapted differently by virtue of being different sizes or shapes to match the different size or shape of the probe or sample (for instance the sample carrier being larger than the probe carrier or applying a stronger vacuum force).

Further aspects of the invention provide methods of collecting data from a sample as set out in the appended claims. A probe carrier and a sample carrier are both carried by the same transport structure, and used to load or unload the probe/sample before or after the data is collected. The probe carrier and the sample carrier are both moved by the transport structure during this process.

The transport structure may comprise a stage which can only move in a straight line, or a single rotary carousel which can only rotate. However more preferably the transport structure comprises a robot arm with a plurality of articulated links, the articulated links comprising a distal link which carries the probe carrier and the sample carrier.

In one embodiment the probe carrier is pivotally coupled to the distal link by a probe carrier arm, and the sample carrier is pivotally coupled to the distal link by a sample carrier arm. The probe and sample carrier arms may be fixed relative to each other, or the probe carrier arm may be able to rotate relative to the sample carrier arm (and vice versa). In another embodiment the probe carrier is pivotally coupled to the distal link by a rotary stage which carries the probe carrier and another probe carrier.

BRIEF DESCRIPTION OF THE DRAWINGS

Embodiments of the invention will now be described with reference to the accompanying drawings, in which:

FIG. 3 is a side view of a probe cassette;

FIG. 4 is a bottom view of the probe cassette of FIG. 3;

FIG. 5 is a top view of the probe cassette of FIG. 3;

FIGS. 8-11 are side views showing a probe cassette being transferred to/from the measurement head;

FIG. 14 is a series of front views showing a wafer being transferred to/from the FOUP;

FIG. 15 is series of side views showing the same sequence of steps as FIG. 14;

FIG. 16 is a series of front views showing a wafer being transferred to/from the sample stage;

FIG. 17 is series of side views showing the same sequence of steps as FIG. 16;

FIG. 18 is a plan view of the sample stage;

FIG. 23 shows a SCARA with a pair of sample carriers;

DETAILED DESCRIPTION OF EMBODIMENT(S)

Figure 1:
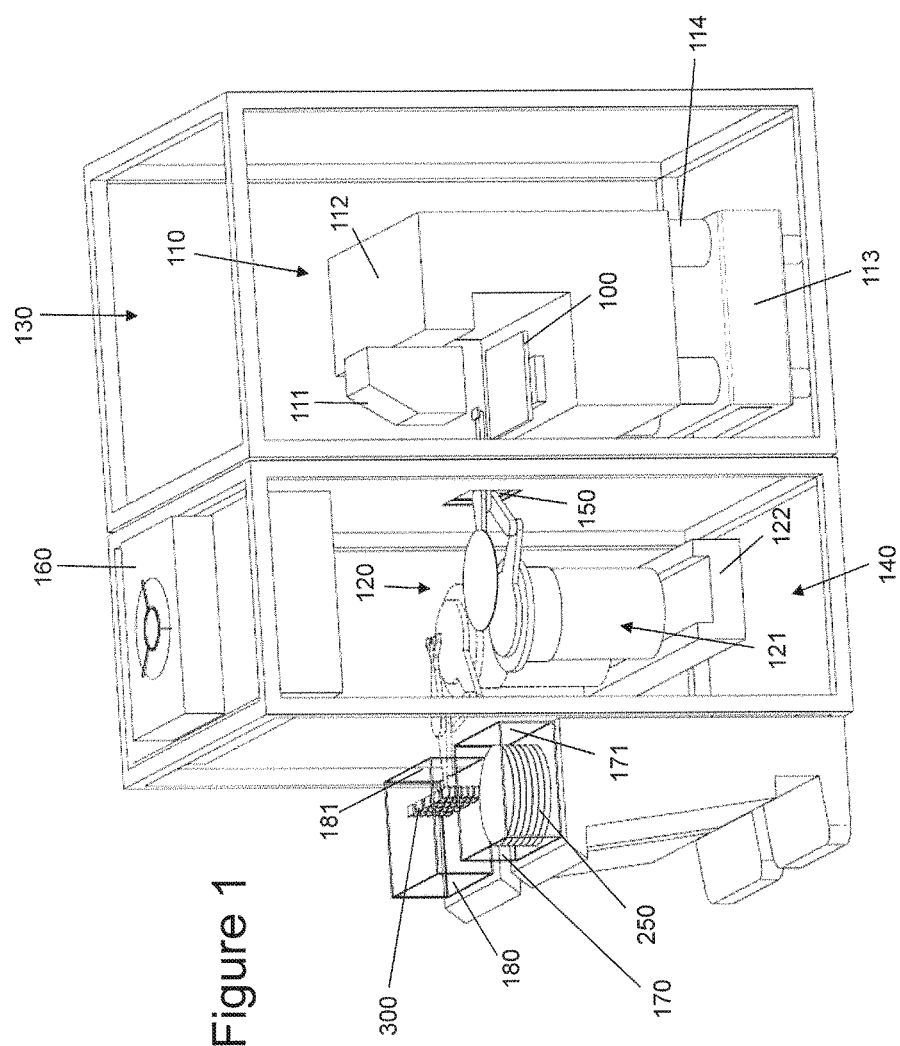
FIG. 1 shows a scanning probe microscope system according to an embodiment of the invention.

A scanning probe microscope system according to an embodiment of the invention is shown in FIG. 1. The system comprises a sample stage 100; a microscope 110 arranged to collect data with a probe carried by the microscope from a sample carried by the sample stage 100; and a probe/sample exchange mechanism 120.

The microscope 110 comprises a measurement head 111 which is carried along with the sample stage 100 by a support structure 112. The support structure 112 is mounted on a support frame 113 via vibration isolation legs 114.

The microscope 110 is housed within a measurement enclosure 130, and the probe/sample exchange mechanism 120 is housed within an environmental front end module (EFEM) enclosure 140. The enclosures 130, 140 are connected to each other by an exchange port 150. A fan filter 160 feeds filtered air into the EFEM enclosure 140, and this filtered air flows into the measurement enclosure 130 via the exchange port 150. A fan filter (not shown) may also be mounted onto the measurement enclosure 130.

A Front Opening Unified Pod (FOUP) 170 is connected to the EFEM enclosure 140 by a wafer load port 171. The FOUP 170 stores a stack of wafers 250. A cassette buffer station 180 is also provided, connected to the EFEM enclosure 140 by a probe load port 181. The cassette buffer station 180 stores stacks of probe cassettes 300.

Figure 6:
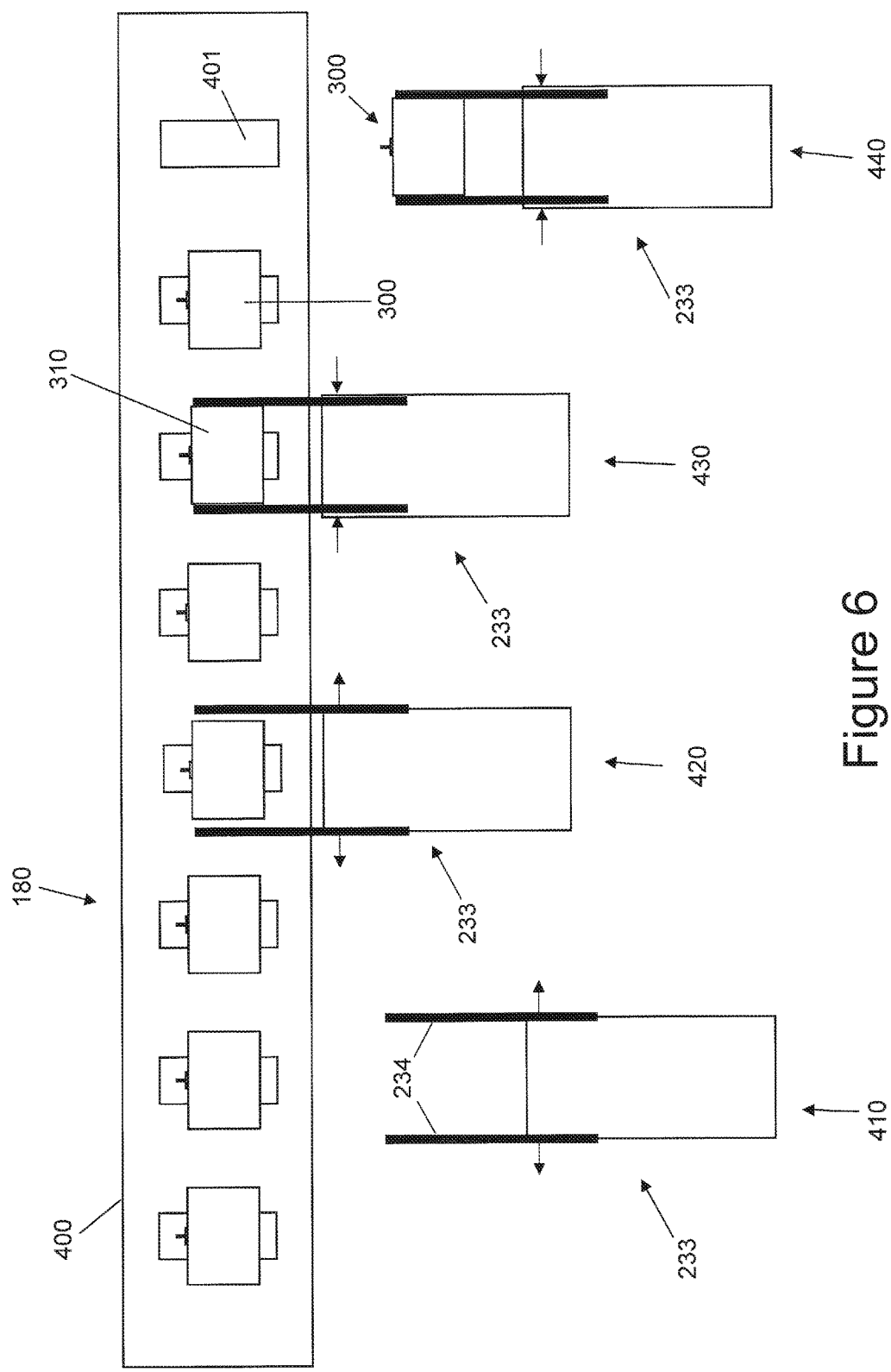
FIG. 6 is a top view of the cassette buffer station showing the probe carrier in a number of different positions.
Figure 13:
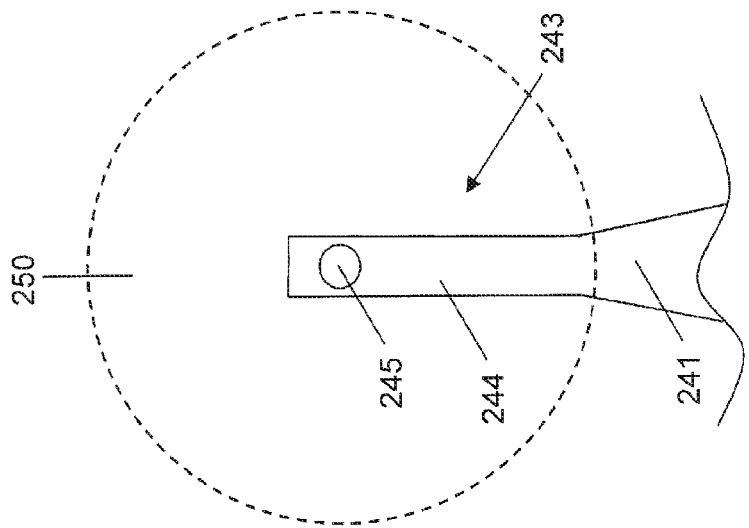
FIG. 13 is a plan view of a wafer being carried by the sample carrier.

The probe/sample exchange mechanism 120 comprises a Selective Compliance Articulated Robot Arm (SCARA) 121 mounted on a linear track 122. The SCARA 121 is shown in detail in FIG. 2, and comprises a proximal link 200 with a proximal end 201 which can be rotated about a vertical (Z) axis by a drive system 210. The proximal link 200 has a distal end 202 which is pivotally coupled to a proximal end 221 of a distal link 220. The distal link 220 has a distal end 222 which is pivotally coupled to a pair of end effectors 230, 240. The end effector 230 comprises a probe carrier arm 231 with a proximal end 232 pivotally coupled to the distal end of the distal link 220, and a probe carrier 233 at its distal end. Note that the probe carrier 233 is not visible in FIG. 2 since it is obscured by a probe cassette 300, but it is shown in FIG. 6 which will be described below. Similarly the end effector 240 comprises a sample carrier arm 241 with a proximal end 242 pivotally coupled to the distal end of the distal link 220, and a sample carrier 243 at its distal end. Note that the sample carrier 243 is not visible in FIG. 2 since it is obscured by a wafer 260, but it is shown in FIG. 13 which will be described below.

The drive system 210 can independently rotate the links 200, 220 of the SCARA and the arms 231, 241 of the end effectors 230, 240 about their respective vertical axes. The drive system 210 can also move the SCARA 121 to and fro along the linear track 122. The proximal link 200 can also be moved up and down in the Z direction by the drive system 210.

A probe cassette 300 will now be described with reference to FIGS. 3-5. The probe cassette comprises a support body 310 with an upper surface 311 and a lower surface 312. The lower surface 312 carries a wedge-shaped mounting member 320 with a horizontal upper surface 321 and an inclined lower surface 322. The lower surface 322 carries a substrate 330, which in turn carries a probe 340. The probe 340 comprises a cantilever beam 341 with a proximal end 342 mounted to the substrate 330, and a free distal end 343. A probe tip 344 extends down from an underside of the beam 341 and is positioned towards the free distal end 343 of the beam 341.

FIG. 6 is a plan view of the probe cassette buffer station 180. The buffer station has a cassette tray 400 with a row of eight cut-outs 401. The tray can carry up to eight probe cassettes each supported by the tray 400 with the probe positioned above the cut-out 401 to avoid damage to the probe.

FIG. 6 shows the probe carrier 233 in four different positions. The probe carrier 233 comprises a pair of grippers 234 which can be moved towards and away from each other by a drive element (not shown) which may be a piezoelectric, pneumatic, electromagnetic, or other actuator. In position 410 the grippers 234 are open. In position 420 the probe carrier 233 has been moved by the SCARA 121 and arm 231 to a probe pick-up station to pick up one of the probes with the grippers 234 still open. In position 430 the grippers have been closed to grip the sides of a cassette support body 310. In position 440 the probe carrier 233 has been moved by the SCARA 121 and arm 231 to remove a cassette from the tray 400.

Figure 7:
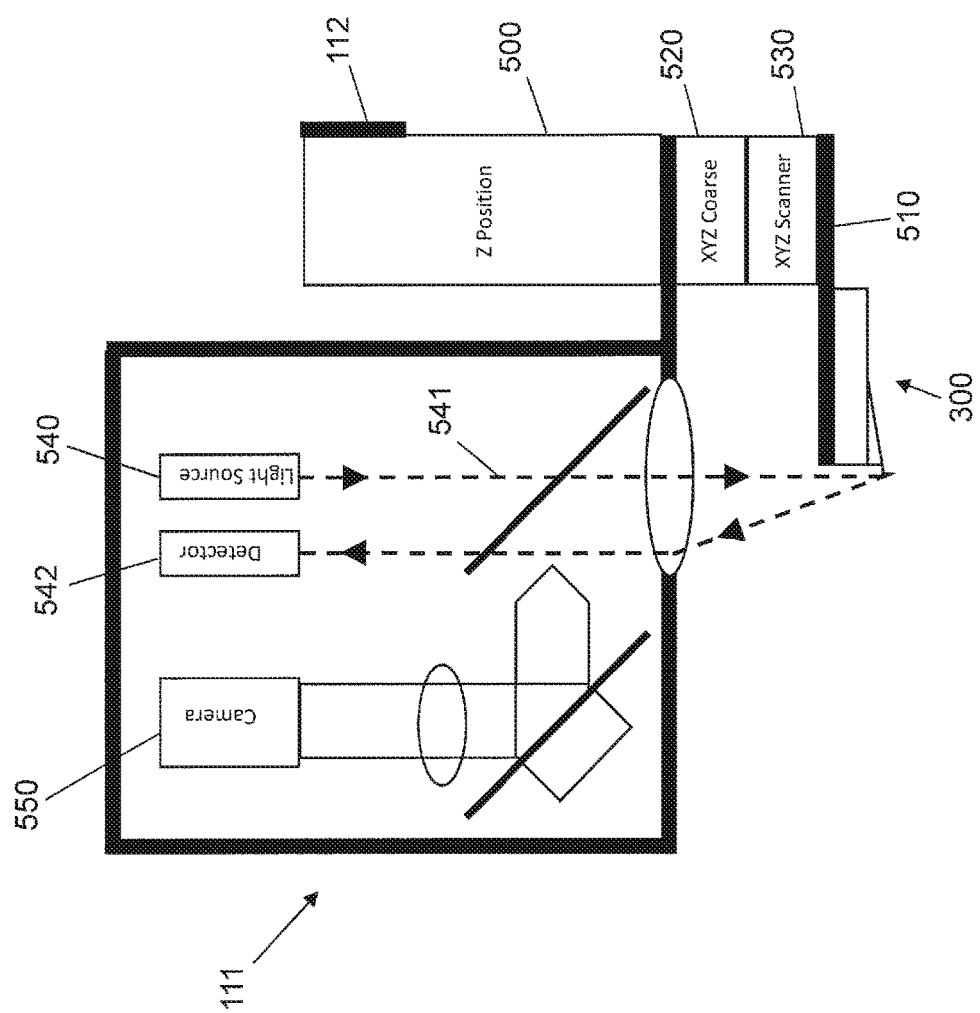
FIG. 7 is a schematic side view of the microscope measurement head.

FIG. 7 is a schematic view of the microscope measurement head 111. The head 111 is mounted to the support structure 112 by a Z-position adjuster 500 which can move the head 111 up and down in the Z-direction relative to the support structure 112. On the underside of the head 111 is a probe support 510 which is suspended from the head 111 by an XYZ coarse driver 520 and an XYZ fine scanner 530 which can each move the probe support 510 relative to the head in X, Y and Z directions. A probe cassette 300 is held to the underside of the probe support 510 by magnetic attraction.

The head 111 contains a light source 540 which illuminates the cantilever beam with a detection beam 541 which is reflected to a light detector 542 such as a split photodiode which detects motion of the probe, The head 111 also contains a camera 550 which can be used to view the probe 340.

The microscope is arranged to collect data with the probe carried by the microscope from a water carried by the sample stage by the following process. The probe is moved close to the surface of the sample until an interaction is detected between the probe tip and surface. In an atomic force microscope (AFM) the interaction force between the probe and surface of the sample is monitored via the bending of the cantilever beam on which the sharp probe tip is mounted. The probe is moved across the surface of the sample, typically in a raster pattern, and the interaction between the probe tip and surface of the sample monitored. While moving the probe across the surface, the height of the probe above the surface may be adjusted to maintain the measured interaction between the probe tip and surface at an approximately constant level. The adjustments made to the height of the probe as it is moved across the surface are used to construct a map of the surface which is often referred to as an image and represents the topography of the surface of the sample.

FIGS. 8-11 show a sequence of steps for transferring a probe cassette to or from the probe support 510. The Figures will be described in terms of transferring a probe cassette from the probe support, and the steps are reversed to transfer a probe to the probe support. In FIG. 8 the probe holder is moved by the SCARA 121 and arm 231 to a probe unloading station immediately below the probe cassette with the grippers 234 open. In FIG. 9 the probe support 510 is moved down by the XYZ coarse driver 520 until the body 310 is positioned between the grippers 234. In FIG. 10 the grippers 234 are closed to grip the sides of the body 310. In FIG. 11 the probe support 510 is moved up by the XYZ coarse driver 520, leaving the probe cassette 300 held between the grippers 234.

Figure 12:
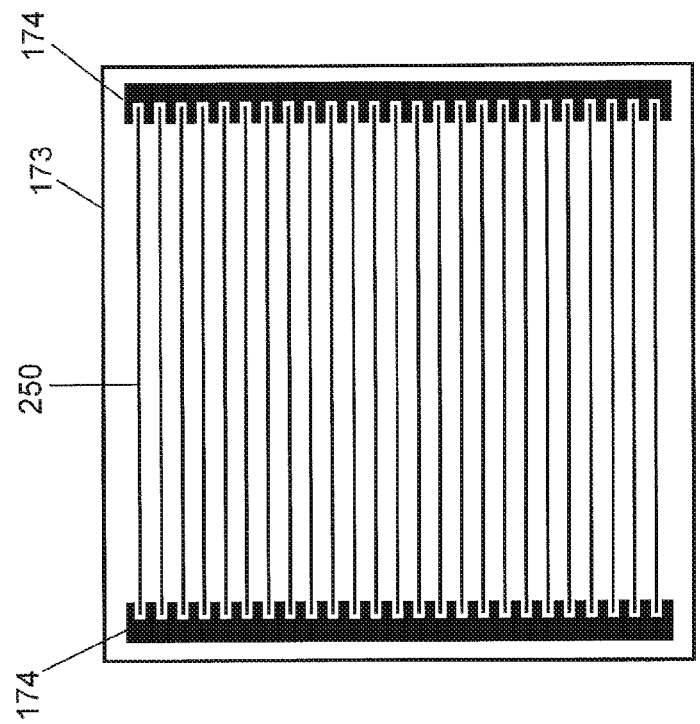
FIG. 12 is a side view of the FOUP.

FIG. 12 shows the FOUP 170 in detail. An enclosure 173 contains two opposed combs 174 of fins supporting typically up to twenty five wafers 250. FIG. 13 is a plan view of the sample carrier 243 carrying a wafer 250. The sample carrier 243 comprises a rectangular arm 244 with a vacuum port 245 towards its distal end.

FIGS. 14 and 15 show a sequence of four steps for transferring a wafer 250 to or from the sample carrier 243. In the first step the sample carrier 243 is moved into position directly below a selected one of the wafers 250, with the vacuum port 245 at the wafer's centre. Then the FOUP enclosure is moved down (or the sample carrier 243 is moved up by the SCARA 121) until the wafer 250 engages the arm 244 of the sample carrier 243. Optionally a vacuum is then applied via the vacuum port 245 to secure the wafer 250 to the arm 244 of the sample carrier 243. Alternatively a vacuum is not applied and the wafer 250 held to the arm 244 by friction only. Then the sample carrier 243 is moved up and away from the combs 174 by the SCARA 121, thereby removing the wafer. Alternatively the FOUP enclosure 173 can be moved down to lift the wafer off the combs. The process is reversed to load a wafer into the FOUP 170.

FIGS. 16 and 17 show a sequence of four steps for transferring a wafer 250 to or from the sample stage 100. The stage 100 has a recess 101 in its upper surface. In the first step the sample holder is moved into position with the wafer directly above the recess 101. Then the wafer is moved down by the SCARA 121 until the wafer engages the upper surface of the stage 100. The vacuum is then turned off (if it was previously turned on to secure the wafer) and the sample carrier 243 is moved to the bottom of the recess by the SCARA 121, leaving the wafer supported by the upper surface of the sample stage 100. The sample stage 100 may hold the wafer with friction only, or optionally a vacuum or mechanical edge gripper (not shown) may be used to hold the wafer in place. Finally the sample carrier 243 is moved away from the sample stage by the SCARA 121. The process is reversed to unload a wafer from the stage.

A typical sequence of steps for operating the system is as follows.

Figure 19:
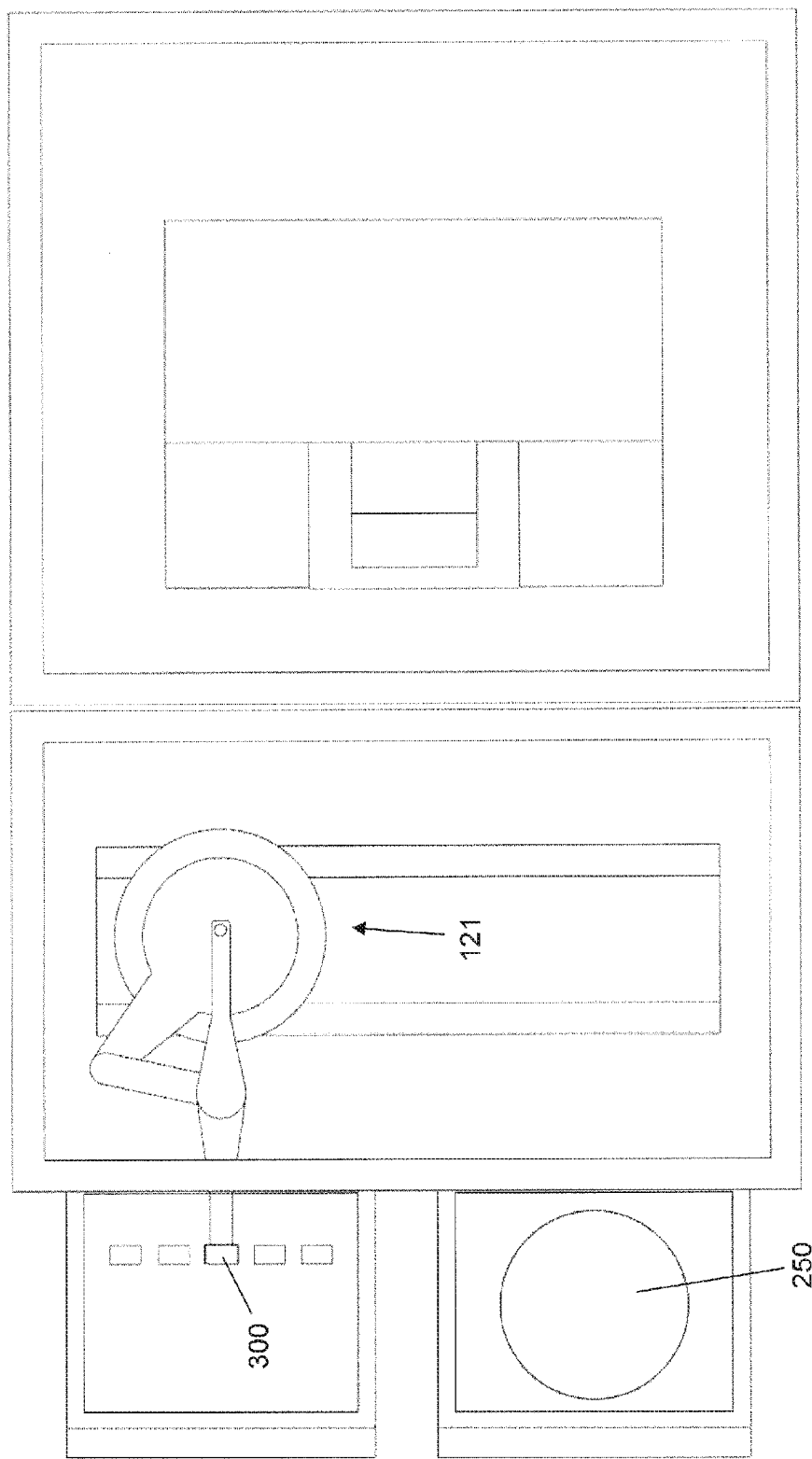
FIG. 19 shows the SCARA transferring a probe cassette to or from the buffer station.
Figure 20:
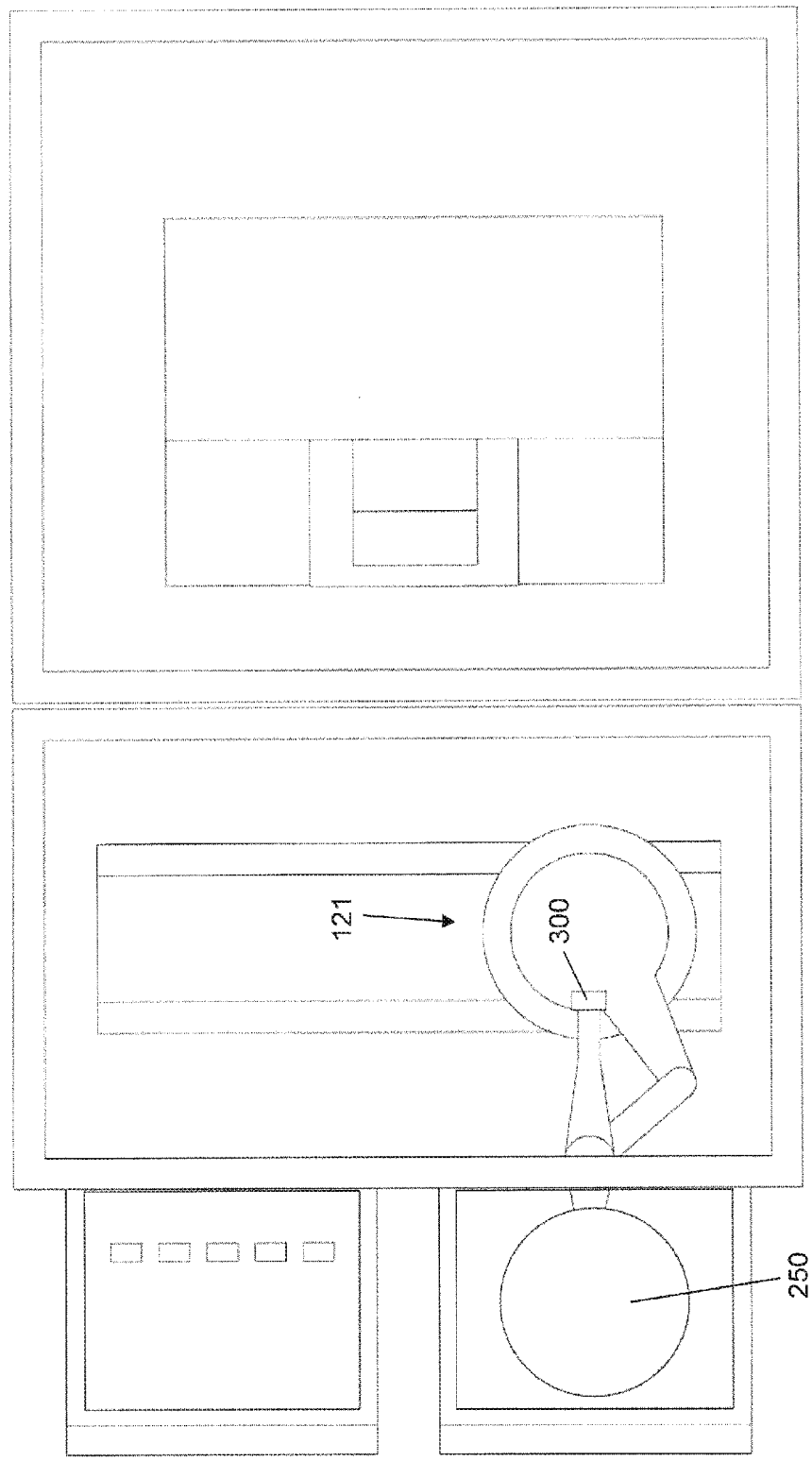
FIG. 20 shows the SCARA transferring a wafer to or from the FOUP.
Figure 21:
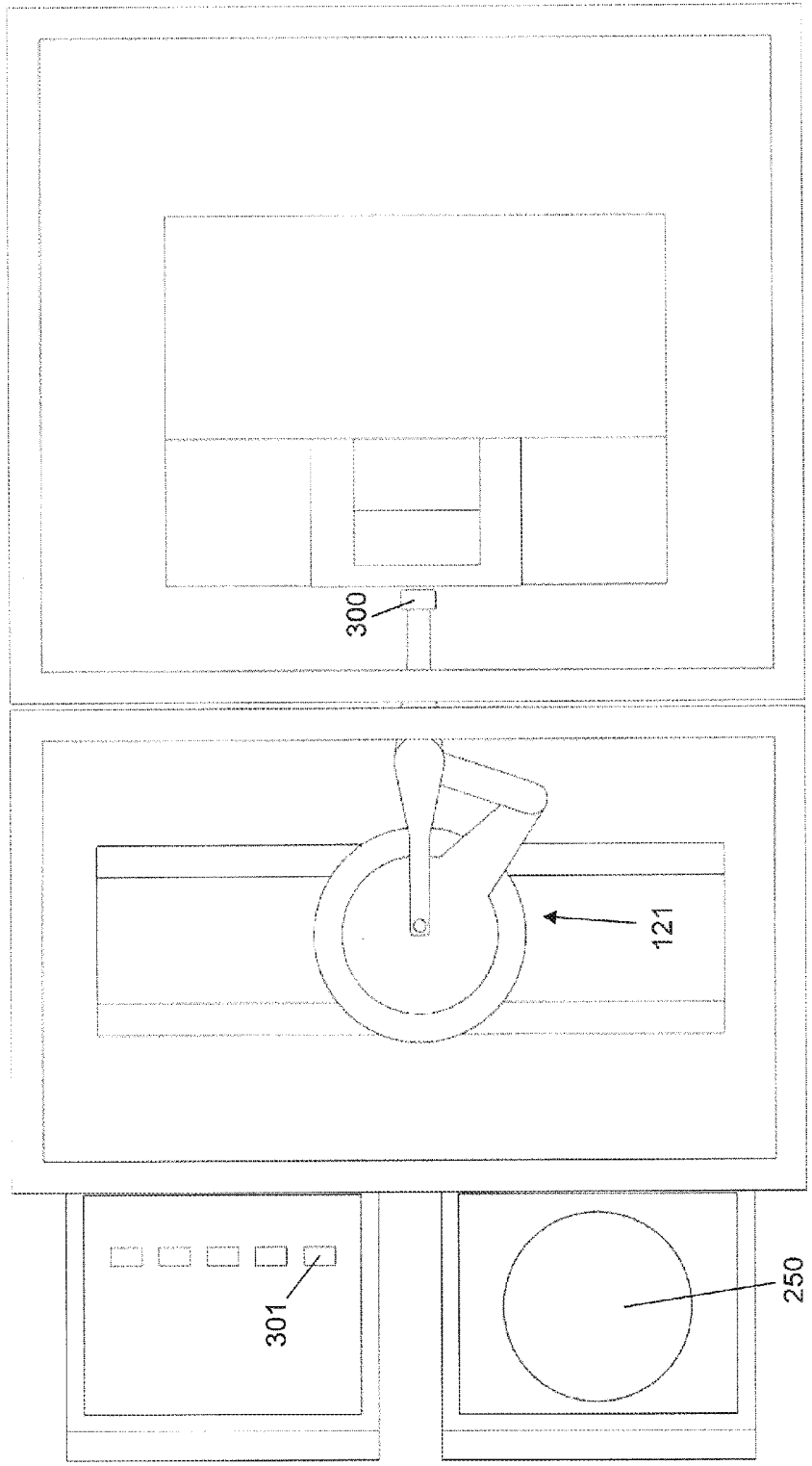
FIG. 21 shows the SCARA transferring a probe cassette to or from the microscope.
Figure 22:
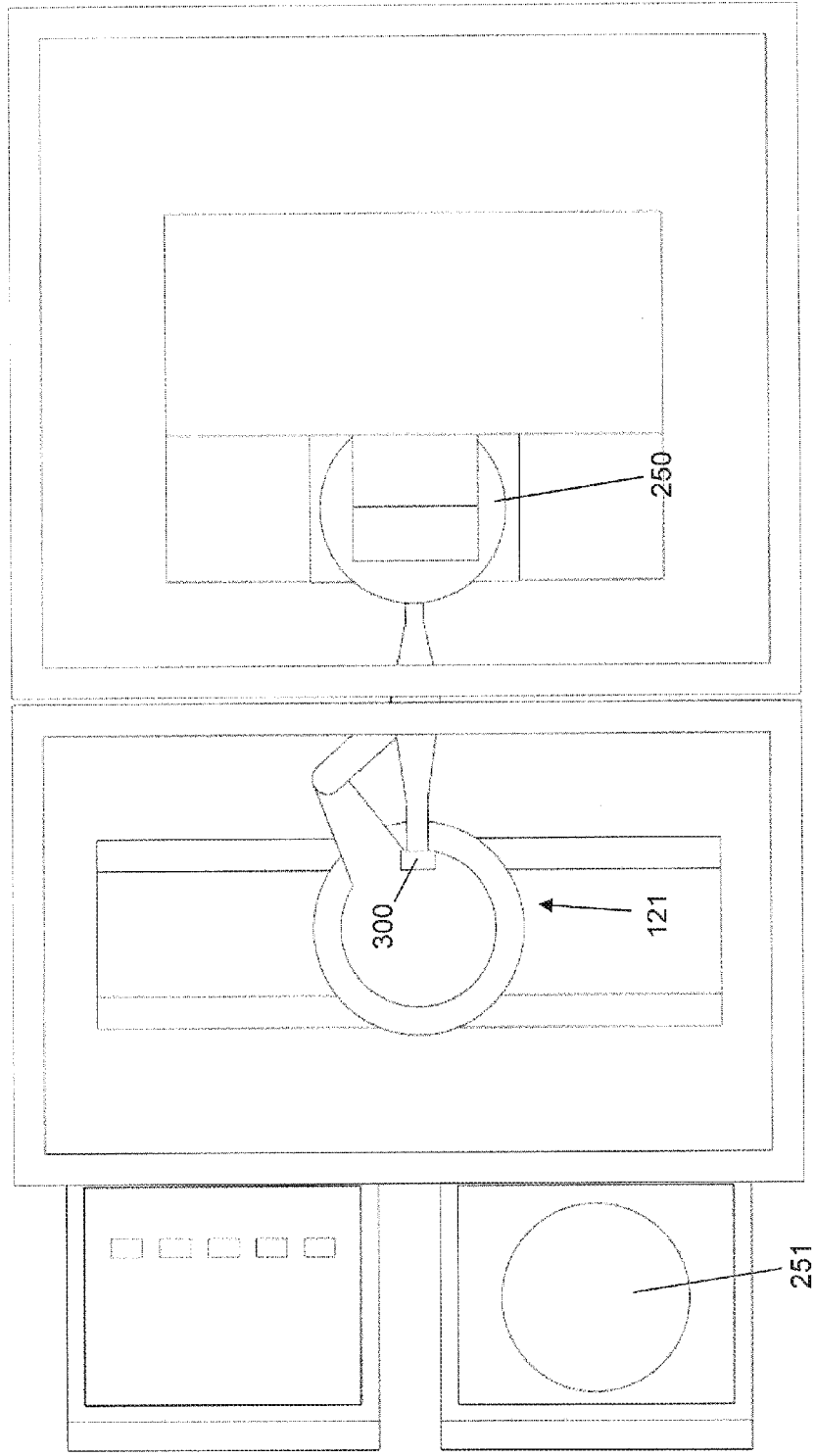
FIG. 22 shows the SCARA transferring a wafer to or from the sample stage.

1. A probe cassette is picked up from the buffer 180 by the process of FIG. 6 (with the SCARA 121 in the position of FIG. 19) and a wafer is picked up from the FOUP 170 by the process of FIGS. 14 and 15 (with the SCARA 121 in the position of FIG. 20). These two steps can be performed in any order.
2. The SCARA 121 is now carrying both a probe cassette and a wafer which are carried together through the port 150 into the enclosure 130.
3. The wafer is transferred to the sample stage by the process of FIGS. 16 and 17, and the probe cassette is transferred to the microscope by the process of FIGS. 8-11. These two steps can be performed in any order. FIG. 21 shows the position of the SCARA 121 as it moves the probe cassette 300 towards the microscope for loading. Note that FIG. 21 does not show a wafer 250 on the sample carrier but optionally a wafer 250 could be carried during this step. FIG. 22 shows the position of the SCARA 121 as it transfers a wafer onto the stage.
4. Data is collected from the wafer on the sample stage with the probe on the microscope.
5. Once all data has been collected, the wafer 250 is unloaded from the sample stage by the process of FIGS. 16 and 17 (with the SCARA 121 in the position of FIG. 22) and then transferred to the FOUP 17 by the process of FIGS. 14 and 15 (with the SCARA 121 in the position of FIG. 20).
6. A new wafer 251 is picked up from the FOUP 170 by the process of FIGS. 14 and 15 (with the SCARA 121 in the position of FIG. 20) and then transferred to the sample stage by the process of FIGS. 16 and 17 (with the SCARA 121 in the position of FIG. 22).
7. Data is collected from the new wafer on the sample stage with the probe on the microscope.
8. Steps 5-7 may be repeated a number of times to collect data from a number of wafers until a new probe is required. When a new probe is required then the probe 300 is unloaded from the microscope by the process of FIGS. 8-11, and then transferred to the buffer by the process of FIG. 6 (with the SCARA 121 in the position of FIG. 19).
9. A new probe cassette 301 is picked up from the buffer 180 by the process of FIG. 6 (with the SCARA 121 in the position of FIG. 19) then transferred to the microscope by the process of FIGS. 8-11.
10. Data is collected from one or more wafers on the sample stage with the new probe cassette 301.

Note that in the example above each wafer is analysed by only a single probe. However, in an alternative routine a wafer can be analysed by a number of probes, each probe being loaded and unloaded by the SCARA 121.

Figure 2:
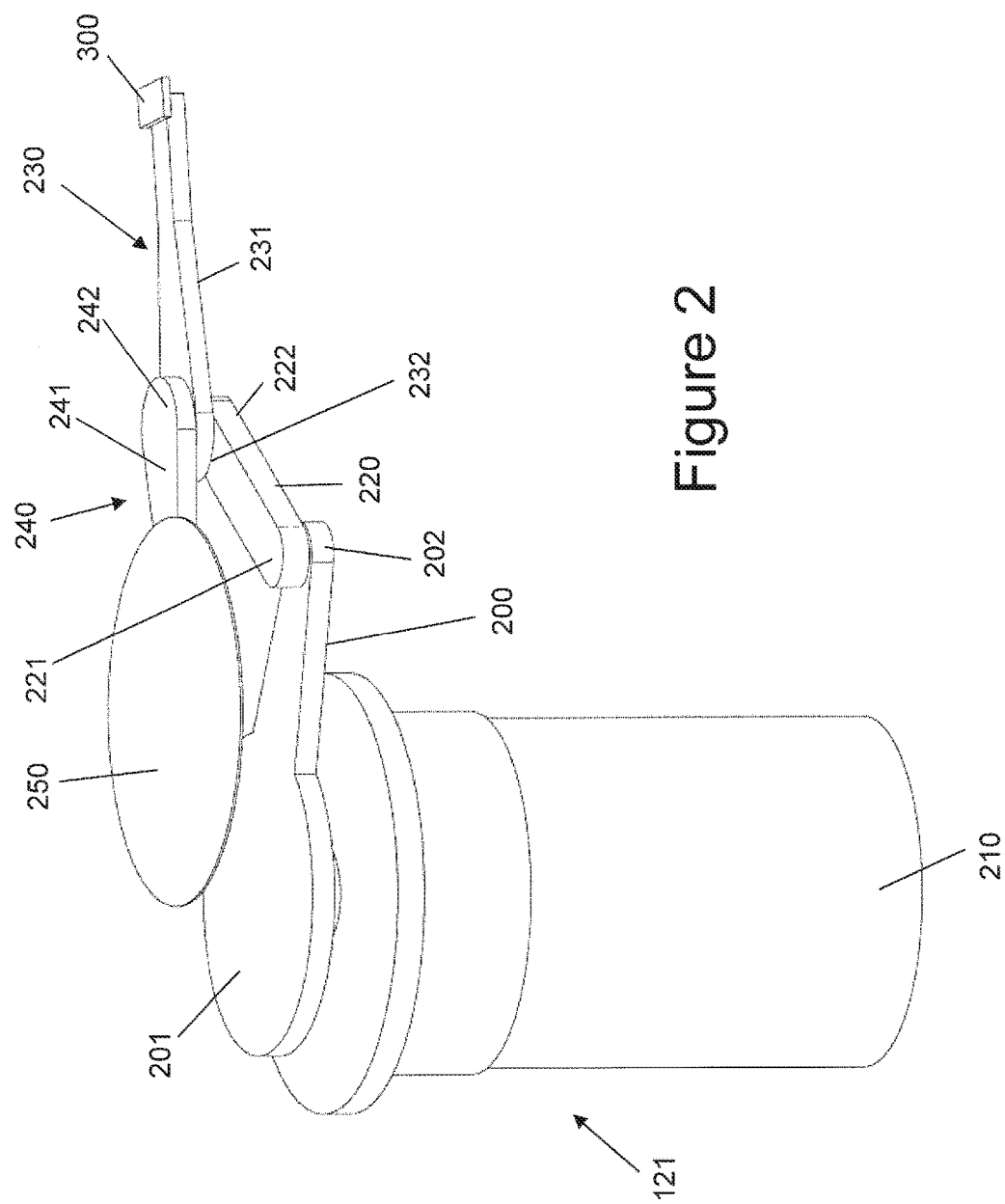
FIG. 2 shows the SCARA.

Note that in the example of FIG. 2 the SCARA has only a single probe end effector 230 and a single sample end effector 240. In an alternative embodiment, the SCARA may carry two or more probe carrier end effectors, and/or two or more sample carrier end effectors. This would enable the SCARA to exchange an old probe for a new probe, and/or exchange an old sample for a new sample, without having to move through the exchange port 150 more than once in each direction.

FIG. 23 is an example of a SCARA 121a with a pair of sample end. The sample end effector 241, 243 is identical to the sample end effector shown in FIG. 13. Another identical sample end effector is provided comprising another sample carrier arm 241a and sample carrier 243a pivotally coupled to the distal link of the robot arm. The two sample carriers 243, 243a can carry the sample and the new sample respectively (or vice versa) at the same time when the sample is exchanged with the new sample. Alternatively the two sample carriers 243, 243a may be adapted differently to carry different samples: for instance the sample carrier 243 may be adapted to carry wafers and the sample carrier 243*a* may be adapted to carry masks.

Figure 25:
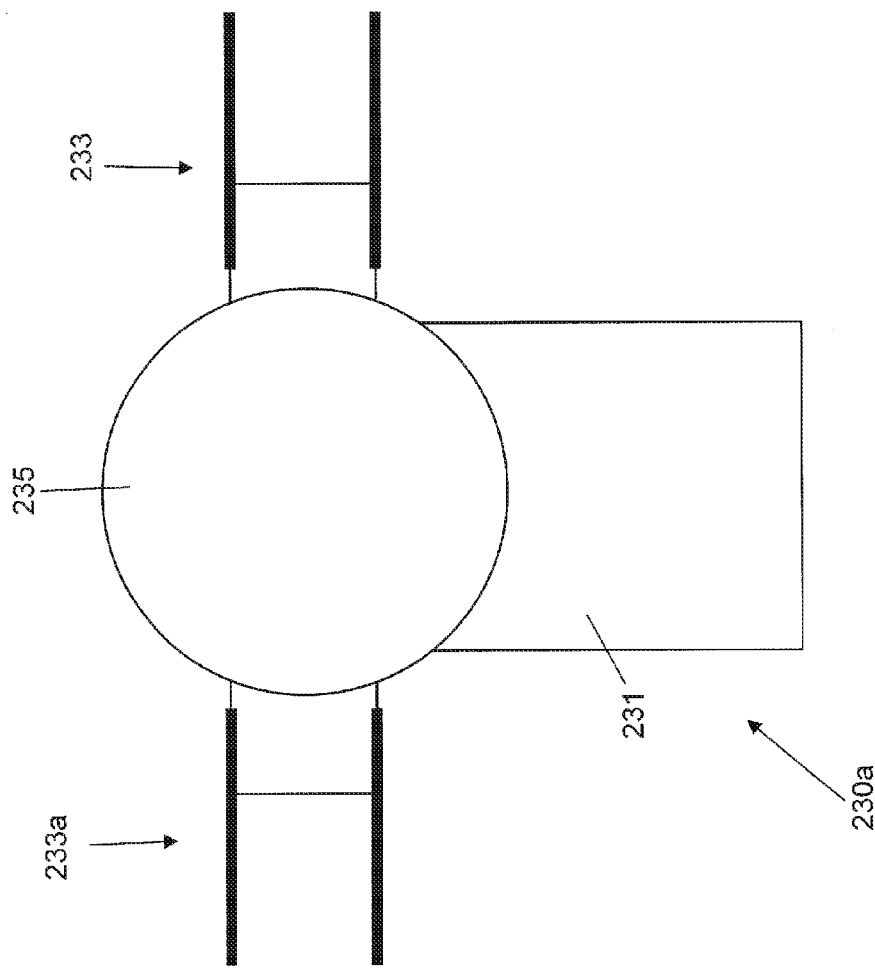
FIG. 25 shows a SCARA with a pair of probe holders.
Figure 24:
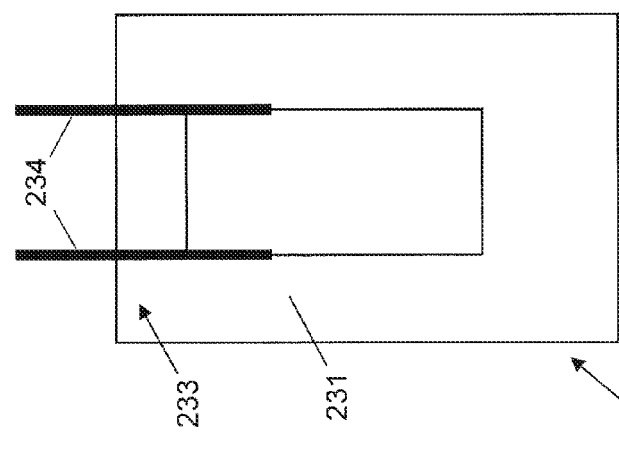
FIG. 24 shows a single probe holder fixedly mounted to the distal end of a probe carrier arm.

FIG. 24 shows the distal end of the probe end effector 230 with a single probe carrier 233 fixedly mounted to the distal end of the probe carrier arm 231. FIG. 25 is an example of a probe end effector 230*a* with a pair of probe carriers 233, 233*a* instead of a single probe carrier. A rotary stage 235 is rotatably mounted to the probe carrier arm 231. The probe carrier 233 is mounted to the rotary stage 235, and another probe carrier 233*a* is also mounted to the rotary stage 235. The pair of probe carriers 233, 233*a* are arranged at 180° so that they can simultaneously carry the probe and the new probe respectively (or vice versa) when the probe is exchanged with the new probe.

In the embodiments described above, the probe carrier 233 comprises a pair of grippers 234 which can be moved towards and away from each other. In an alternative embodiment, such an active probe carrier (with vacuum or moving parts) can be replaced by a passive probe carrier (with no moving parts) which grips the probe with a magnetic field or friction.

In the embodiments described above, the SCARA comprises a proximal link 200 pivotally coupled to a distal link 220. The distal link 220 is pivotally coupled to a pair of end effectors: namely a probe end effector 230 and a sample end effector 240. The probe end effector 230 comprises a probe carrier arm 231 with a probe carrier 233 at its distal end. Similarly the sample end effector 240 comprises a sample carrier arm 241 with a sample carrier 243 at its distal end. In an alternative embodiment of the invention (not shown) only a single carrier arm is pivotally coupled to the distal link 220, and that single carrier arm carries both a probe carrier (like the probe carrier 233) and a sample carrier (like the sample carrier 243).

In the embodiments described above, the probe carrier 233 loads/unloads the probe cassettes directly onto/from the microscope measurement head 111. In an alternative embodiment of the invention illustrated in FIGS. 26-28, the probe carrier 233 loads/unloads the probe cassette 300 onto/from the sample stage 100 rather than onto/from the microscope measurement head 111.

Figure 26:
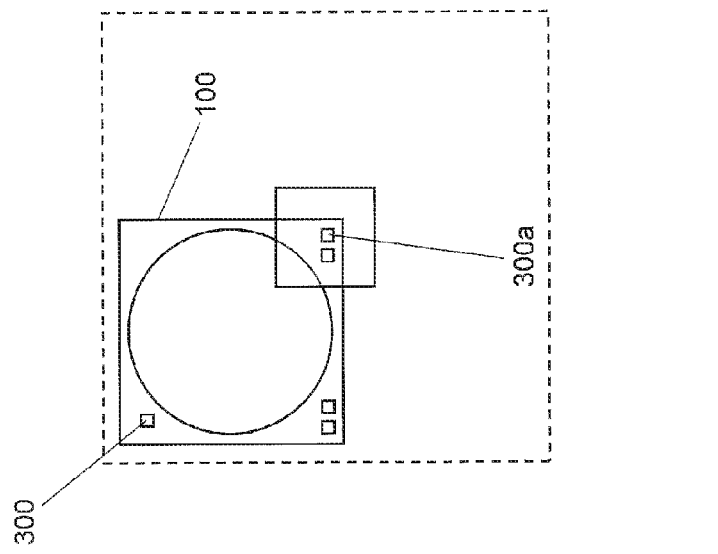
FIG. 26 shows a sample stage at an imaging position.
Figure 27:
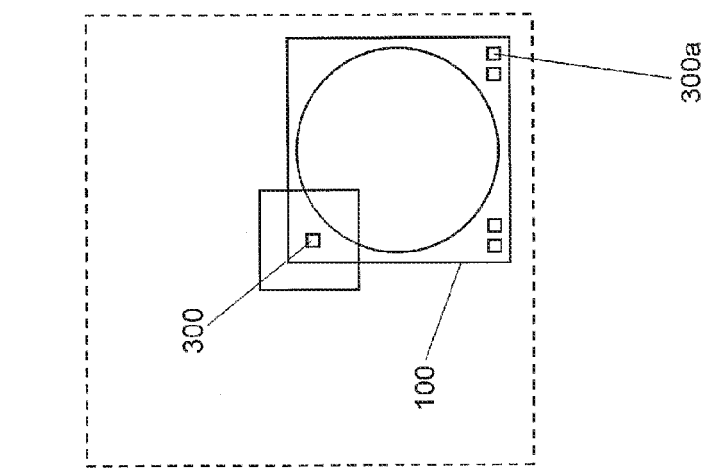
FIG. 27 shows the sample stage at a drop-off position.

FIG. 26 is a plan view of the sample stage 100 carrying a wafer 250 in an imaging position directly below the microscope measurement head 111. A probe cassette 300 is carried by the microscope measurement head 111 so that it can collect data from the wafer 250.

Four replacement probe cassettes 300*a* have previously been loaded onto the edge of the sample stage 100 by the probe carrier 233. In order to exchange the probe cassette 300 carried by the microscope with one of the replacement probe cassettes 300*a*, the sample stage 100 is first moved to the drop-off position shown in FIG. 27. The measurement head 111 is then moved down by the Z-position adjuster 500 and the used probe cassette 300 is dropped off on the sample stage. This drop-off is achieved by attracting the probe cassette 300 onto the sample stage 100 with a vacuum force which exceeds the magnetic attraction of the probe support 310.

Figure 28:
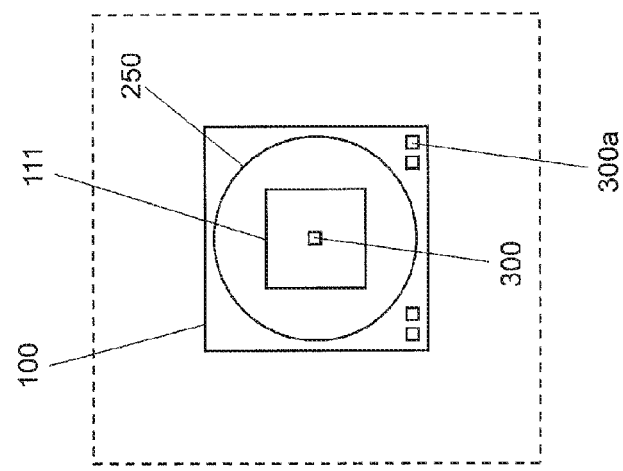
FIG. 28 shows the sample stage at a pick-up position.

Next, the sample stage 100 is moved to the pick-up position shown in FIG. 28, and one of the replacement probe cassettes 300*a* is picked up by the probe support 510 (with the vacuum attracting the probe cassette 300*a* to the sample stage turned off). The new probe cassette 300*a* carried by the microscope measurement head 111 can now be used to collect data from the wafer 250.

At a later time, the probe end effector 230 is operated to unload the used probe cassette 300 (and any other used probe cassettes) from the sample stage 100, and replace them with further replacement probe cassettes.

In the embodiment of FIG. 25 a probe end effector 230*a* has a pair of identical probe carriers 233, 233*a*. In an alternative embodiment of the invention (not shown) the probe end effector may have a probe carrier 233 which is adapted to load a probe cassette onto the microscope head, and a probe carrier (not shown) which is different from the probe carrier 233 in that it is adapted to load a probe cassette onto the sample stage rather than the microscope head.

Although the invention has been described above with reference to one or more preferred embodiments, it will be appreciated that various changes or modifications may be made without departing from the scope of the invention as defined in the appended claims.

The invention claimed is:

1. A scanning probe microscope system comprising:
   a. a sample stage;
   b. a microscope arranged to collect data with a probe carried by the microscope from a sample carried by the sample stage; and
   c. a probe/sample exchange mechanism which is arranged to exchange the probe carried by the microscope or carried by the sample stage with a new probe, and is also arranged to exchange the sample carried by the sample stage with a new sample, wherein the probe/sample exchange mechanism comprises:
      i. a transport structure which can move relative to the microscope and the sample stage;
      ii. a probe carrier carried by the transport structure and adapted to carry the probe or the new probe when the probe is exchanged with the new probe;
      iii. a sample carrier carried by the transport structure, wherein the sample carrier is adapted differently from the probe carrier to carry the sample or the new sample when the sample is exchanged with the new sample; and
      iv. a drive system arranged to move the transport structure relative to the microscope and the sample stage when the probe is exchanged with the new probe and the sample is exchanged with the new sample.

2. The microscope system of claim 1 wherein the probe carrier comprises a pair of grippers which can move together to grip the probe.

3. The microscope system of claim 1 wherein the sample carrier comprises a binding system for securing the sample to the sample carrier by suction or magnetic attraction.

4. The microscope system of claim 1 wherein the transport structure comprises a robot arm with a plurality of articulated links, the articulated links comprising a distal link which carries the probe carrier and the sample carrier.

5. The microscope system of claim 4 wherein the probe carrier is pivotally coupled to the distal link by a probe carrier arm, and the sample carrier is pivotally coupled to the distal link by a sample carrier arm.

6. The microscope system of claim 1, wherein the probe/sample exchange mechanism further comprises another probe carrier which is carried by the transport structure and adapted to carry the probe at the same time that the new probe is carried by the probe carrier.

7. The microscope system of claim 1, wherein the probe/sample exchange mechanism further comprises another sample carrier which is carried by the transport structure and adapted to carry the sample at the same time that the new sample is carried by the sample carrier.

8. The microscope system of claim 1 further comprising a microscope enclosure which encloses the microscope, and an exchange port in the enclosure, wherein the drive system is arranged to move the transport structure so that the probes and samples can be moved by the probe carrier and the sample carrier respectively in and out of the microscope enclosure through the exchange port when the probe is exchanged with the new probe and the sample is exchanged with the new sample.

9. The microscope system of claim 1 wherein the transport structure, the probe carrier, the sample carrier and the drive system are part of an assembly, and wherein the system is configured to move the entire assembly to and fro along a track relative to the microscope.

10. The microscope system of claim 1 wherein the transport structure, the probe carrier, the sample carrier and the drive system are part of a first assembly, and wherein the system is configured to move the entire first assembly to and fro along a track relative to the microscope, the microscope system further comprising a second assembly separate from the first assembly, the second assembly including:
   i. a second transport structure which can move relative to the microscope and the sample stage;
   ii. a second probe carrier carried by the second transport structure and adapted to carry a probe when probes are exchanged;
   iii. a second sample carrier carried by the second transport structure, wherein the second sample carrier is adapted differently from the second probe carrier to carry a sample when samples are exchanged; and
   iv. a second drive system arranged to move the second transport structure relative to the microscope and the sample stage when a probe is exchanged with another probe and a sample is exchanged with another sample; and
wherein the system is configured to move the entire second assembly to and fro along the track relative to the microscope.

11. A method of collecting data from a sample, the method comprising:
   a. loading a probe onto a microscope or a sample stage with a probe carrier carried by a transport structure;
   b. loading the sample onto the sample stage with a sample carrier carried by the transport structure; and
   c. after steps a. and b., collecting data from the sample on the sample stage with the probe on the microscope,
wherein the probe carrier and the sample carrier are both moved by the transport structure during each of steps a. and b.

12. The method of claim 11 further comprising
   d. after step c., unloading the probe from the microscope or the sample stage with the probe carrier carried by the transport structure, or with another probe carrier which is also carried by the transport structure; and
   e. after step c., unloading the sample from the sample stage with the sample carrier carried by the transport structure, or with another sample carrier which is also carried by the transport structure,
wherein the probe carrier(s) and the sample carrier(s) are all moved by the transport structure during each one of steps a., b., d. and e.

13. The method of claim 11 wherein step a. comprises:
   i. picking up the probe with the probe carrier carried by the transport structure;
   ii. after step i., moving the transport structure to move the probe carrier carrying the probe to the microscope or the sample stage, the sample carrier also moving during step ii.;
   iii. after step ii., transferring the probe from the probe carrier to the microscope or the sample stage; and
   iv. after step iii., moving the transport structure to move the probe carrier away from the microscope or the sample stage, the sample carrier also moving during step iv.

14. The method of claim 11 wherein step b. comprises:
   i. picking up the sample with the sample carrier carried by the transport structure;
   ii. after step i., moving the transport structure to move the sample carrier carrying the sample to the sample stage, the probe carrier also moving during step ii.;
   iii. after step ii., transferring the sample from the sample carrier to the sample stage; and
   iv. after step iii., moving the transport structure to move the sample carrier away from the sample stage, the probe carrier also moving during step iv.

15. The method of claim 11 wherein:
the action of loading the probe onto the microscope and the action of loading the sample onto the sample stage are executed using robotic components.

16. A method of collecting data from a sample, the method comprising:
   a. collecting data from the sample on a sample stage with a probe on a microscope;
   b. after step a., unloading the probe from the microscope or the sample stage with a probe carrier carried by a transport structure; and
   c. after step a., unloading the sample from the sample stage with a sample carrier carried by the transport structure,
wherein the probe carrier and the sample carrier are both moved by the support structure during each of steps b. and c.

17. The method of claim 16 wherein step b. comprises:
   i. transferring the probe from the microscope or the sample stage to the probe carrier;
   ii. after step i., moving the transport structure to move the probe carrier carrying the probe away from the microscope or the sample stage, the sample carrier also moving during step ii.; and
   iii. after step ii., removing the probe from the probe carrier.

18. The method of claim 16 wherein step c. comprises:
   i. transferring the sample from the sample stage to the sample carrier;
   ii. after step i., moving the transport structure to move the sample carrier carrying the sample away from the sample stage, the probe carrier also moving during step ii.; and
   iii. after step ii., removing the sample from the sample carrier.

19. The method of claim 16 further comprising gripping the probe with the probe carrier.

20. The method of any of claim 16 further comprising securing the sample to the sample carrier by suction or magnetic attraction.

* * * * *